US012263611B2

(12) United States Patent
Bodivit et al.

(10) Patent No.: US 12,263,611 B2
(45) Date of Patent: Apr. 1, 2025

(54) METHOD AND SYSTEM FOR AUTOMATIC CUTTING OF DEFECTIVE PORTIONS IN A PATTERNED FABRIC

(71) Applicant: LECTRA, Paris (FR)

(72) Inventors: Stéphane Bodivit, Cestas (FR); Régis Lainé, Cestas (FR); Cory Crawford, Saint Jean d'illac (FR); Sébastien Duchesne, Le Barp (FR)

(73) Assignee: LECTRA, Paris (FR)

( * ) Notice: Subject to any disclaimer, the term of this patent is extended or adjusted under 35 U.S.C. 154(b) by 81 days.

(21) Appl. No.: 17/914,253

(22) PCT Filed: Mar. 18, 2021

(86) PCT No.: PCT/FR2021/050456
§ 371 (c)(1),
(2) Date: Sep. 23, 2022

(87) PCT Pub. No.: WO2021/191532
PCT Pub. Date: Sep. 30, 2021

(65) Prior Publication Data

US 2023/0110371 A1 Apr. 13, 2023

(30) Foreign Application Priority Data

Mar. 26, 2020 (FR) ...................................... 2002947

(51) Int. Cl.
*B26D 5/00* (2006.01)
*D06H 7/00* (2006.01)

(52) U.S. Cl.
CPC ............... *B26D 5/005* (2013.01); *D06H 7/00* (2013.01); *B26D 2005/002* (2013.01)

(58) Field of Classification Search
CPC .. B26D 5/005; B26D 5/007; B26D 2005/002; D06H 7/00; D06H 2201/00; D06H 2201/10
(Continued)

(56) References Cited

U.S. PATENT DOCUMENTS 3,805,650 A 4/1974 Pearl
5,831,857 A * 11/1998 Clarino ................ G06Q 10/043 700/134

(Continued)

FOREIGN PATENT DOCUMENTS

EP 0759708 A1 3/1997
FR 2731595 A1 9/1996

OTHER PUBLICATIONS

French Search Report from corresponding French Application No. FR2002947, Dec. 14, 2020.

(Continued)

*Primary Examiner* — Nathan E Durham
(74) *Attorney, Agent, or Firm* — Workman Nydegger

(57) ABSTRACT

A method and system for automatic cutting of defective parts in a fabric with a pattern repeating at a certain pitch, includes the steps of producing a theoretical layout of parts to be cut on a theoretical representation of the fabric whilst respecting layout constraints, spreading out at least one layer of fabric on a cutting table, checking at least one portion of the spread-out fabric to ascertain actual features, modifying the theoretical layout in order to generate an actual layout taking into account the actual features of the fabric, identifying in the actual layout, defective parts which will contain defects once cut in the fabric and which will need to be cut again, and automatically allocating each defective part to a
(Continued)

new theoretical layout by adjusting the layout constraints associated with the defective parts according to the actual layout.

9 Claims, 4 Drawing Sheets

(58) Field of Classification Search
USPC .......................................................... 700/134
See application file for complete search history.

(56) References Cited

U.S. PATENT DOCUMENTS

| | | | | |
|---|---|---|---|---|
| 5,975,743 | A | 11/1999 | Bercaits | |
| 2007/0293975 | A1* | 12/2007 | Hama | B26D 5/00 700/134 |
| 2017/0368706 | A1* | 12/2017 | Zünd | G06F 3/017 |

OTHER PUBLICATIONS

International Search Report from corresponding French Application No. PCT/FR2021/050456, Jul. 9, 2021.

* cited by examiner

METHOD AND SYSTEM FOR AUTOMATIC CUTTING OF DEFECTIVE PORTIONS IN A PATTERNED FABRIC

TECHNICAL FIELD

The invention relates to the general field of automatic cutting of parts in a fabric with a pattern repeating at a certain pitch, referred to as the pattern pitch. In particular, it relates to the management of defective parts which will contain defects once cut in the fabric and which will need to be cut again.

The invention applies, in particular, to the clothing and furniture industries.

PRIOR ART

When the production of articles of clothing or items of furniture involves assembly of parts cut from a fabric, particular constraints exist if the fabric has a pattern. Here, "patterned fabric" shall mean any flexible sheet textile material printed with a pattern which repeats with regular and predetermined pitches.

In this case, it is therefore desirable, or even necessary, to respect the continuity of the pattern between two assembled parts, for example two parts of a garment sewn to one another or two parts intended to be adjacent, for example two clothing parts located side-by-side when the garment is worn, or two cushions of a sofa placed side-by-side.

In order to comply with these constraints, it is known to associate absolute or relative position markers with the parts and to establish a hierarchy between main parts and secondary parts.

An absolute position marker is normally associated with a main part. It characterises the absolute positioning of the main part with respect to the fabric pattern. The position of a part with respect to the pattern is characterised by the fact that a given point of the surface of the part occupies a determined relative position with respect to the patterns which surround it. Hence, parts for which the locations at the surface of the fabric are deduced from one another by translations by an integer number of pattern pitches occupy the same position with respect to the pattern.

Relative position markers are associated with two parts which need to be assembled taking into account requirements linked to the existence of the pattern. They identify the locations of two connection points which must be brought into correspondence during the assembly of the parts.

For example, in the case of a jacket, a back part may constitute a main part. An absolute position marker is optionally associated with the back part, for example when it is desired that a complete pattern is visible at a particular location on this part. A sleeve, the neckline and a front then constitute secondary parts. For each of these, the location of a connection point is determined to correspond to the location of the associated connection point on the main part.

Moreover, a part to which a relative position marker is associated can also be the main part of one or more other parts. In this case, a connection chain is referred to. Similarly, a part can have a absolute, relative or no position marker, in the axis of the weft thread, and another type of position marker (relative, absolute or none) for the axis of the warp thread of the fabric.

Furthermore, it is known to produce the fabric cut automatically. Automatic cutting equipment has been marketed by the applicant for many years.

Typically, an automatic cutting method comprises a layout operation which consists in optimally determining the positions of the parts to be cut in a strip of fabric. The layout is chosen so as to minimise fabric losses while respecting certain constraints: compliance with the grain, sufficient minimum margin between parts, etc. In the case of a patterned fabric, constraints are added related to compliance with the locations of the absolute position and relative position markers. Systems enabling an operator to define layouts using computer workstations and specialised software are known, including in the case of patterned fabrics.

In order to carry out the cut, the fabric is spread out on a cutting table in one or more superposed layers which can be held by suction through the table. The cut is carried out by means of a tool carried by a head, the movements of which, with respect to the cutting table, are controlled according to the predetermined layout. The cut can be carried out by a vibrating blade, rotating blade, laser, water jet, etc.

Difficulties arise when the fabric used is a patterned fabric. In particular, in practice the problem arises of the non-coincidence between the fabric model used for the layout and the fabric actually spread out on the cutting table. This non-coincidence is manifest, in particular, in the following manner. If placed on the cutting table at the coordinates of a reference point of a part of the layout, one would notice that the corresponding point on the spread-out fabric does not always occupy the desired position with respect to the actual fabric pattern. These differences are more or less large and, in practice, inevitable. They are due to printing defects, positioning defects of fabric on the cutting table, variations in density of the threads of the loom and/or deformations of the fabric which can result in irregularities in the repetition pitch of the pattern. The result is that the pre-established layout, or theoretical layout, must be modified in order to correspond to the reality of the spread-out fabric.

A method for performing this layout modification automatically is described in document EP 0,759,708 filed in the name of the applicant. After spreading out of the patterned fabric on the cutting table, this method envisages detecting any offset between the actual pitch of the pattern on the fabric and the theoretical pitch thereof by taking images of portions of the spread-out fabric then verifying, on the images taken, that the locations corresponding to the stored information occupy the desired positions with respect to the actual pattern of the spread-out fabric. If necessary, the theoretical layout of the parts is modified according to the result of the check in order to adjust to the actual pitch of the pattern on the spread-out fabric taking account of the actual features of the fabric.

As the actual layout of a group of parts provided on a portion of fabric is generated, the cutting phase of this group of parts is launched. However, during this phase, many problems are often encountered, in particular in terms of the fabric to be cut. Indeed, it is frequently the case that this fabric has defects, tears, coloured degradations of the material, etc. at certain places. However, when a part of the layout is cut at these places, it becomes unusable and must therefore be cut again. Similarly, the modification of the layout of the parts to be cut sometimes has the consequence of causing a repositioning of the parts, wherein certain adjacent parts overlap. In this situation, these parts become unusable, and it is therefore necessary to cut them again. In practice, these problems require the operator to cut again all the parts of the layout which are concerned (called hereinafter "defective parts") at the end of the cutting phase.

Generally, the defective parts which need to be cut again are manually cut by the operator after the cutting of the other parts of the layout. In practice, the operator cuts a swatch from the roll of fabric and cuts the defective part again manually. However, this cutting again manually can prove particularly complicated when the defective part is a daughter part with which a relative layout constraint is associated with respect to a mother part. Indeed, in this situation, the operator must carry out the connection manually by finding the mother part and its connection with the daughter part to be cut again, then transfer this type of constraint manually onto the swatch in which the part will be cut again. Furthermore, it may be necessary to repeat these operations for all the parts having a relative position marker the respect to the part cut again.

This method of cutting again manually has many disadvantages. Firstly, the automatic part cutting process is interrupted. Further, the use of the material is not optimised (resulting in a waste of fabric) and the quality of the connections with the fabric pattern most often lacks precision.

DISCLOSURE OF THE INVENTION

The present invention therefore proposes a method for automatic cutting of defective parts in a patterned fabric, in which the defective parts are cut again automatically.

In accordance with the invention, this goal is achieved by a method for automatic cutting of defective parts in a fabric with a pattern repeating at a certain pitch, referred to as the pattern pitch, comprising the steps of:

- producing a theoretical layout of parts to be cut on a theoretical representation of the fabric, while respecting layout constraints associated with the parts;
- spreading out at least one layer of fabric on a cutting table;
- ascertaining actual features of at least one portion of the spread-out fabric;
- modifying the theoretical layout in order to generate an actual layout of parts on the spread-out fabric, taking into account the actual features of the fabric;
- identifying, in the actual layout, defective parts which will contain defects once cut in the fabric and which will need to be cut again; and
- automatically allocating each defective part to a new theoretical layout by adjusting the layout constraints associated with the defective parts according to the actual layout.

The method according to the invention is characterised in that it envisages automatically cutting again the defective parts by assigning them to a new layout, this assignment being carried out so as to retain their layout constraints in order to adjust them according to the actual layout. In other words, the method according to the invention envisages recording the layout constraints on the spread-out fabric of the defective parts in order to translate them into positioning constraints for the new layout from which the defective parts will be cut again.

The method according to the invention is thus particularly advantageous in that the process of cutting the defective parts again is entirely automated. As a result, the automatic part cutting process does not need to be interrupted. Furthermore, this automation makes it possible to optimise the material in order to limit waste and to guarantee a high precision in the quality of the connections with the fabric pattern.

Preferably, a reference point and a layout constraint on the fabric is associated with each part to be cut, chosen from:

a) an absolute constraint for which the position of the reference point of the part with respect to the fabric pattern is determined so that a fabric pattern appears in a desired position on the part;

b) a relative constraint for which the position of the reference point of the part, referred to as the daughter part, is determined with respect to a connection point of another part, referred to as the mother part, so that the position of the reference point of the daughter part with respect to the fabric pattern is the same as the position of the connection point of the mother part;

c) a relative symmetry constraint for which the position of the reference point of the part, referred to as the daughter part, is determined with respect to a connection point of another part, called the mother part, so that the position of the reference point of the daughter part with respect to the fabric pattern is symmetric with respect to the pattern of the position of the connection point of the mother part; and d) a free constraint for which the position of the reference point of the part with respect to the fabric pattern is free.

When the defective part is a part with which an absolute constraint is associated (case a) above), automatically allocating the part to the new theoretical layout advantageously comprises retaining this absolute constraint with respect to the fabric pattern in the new theoretical layout.

When the defective part is a daughter part with which a relative constraint or a relative symmetry constraint is associated with respect to a mother part which does not need to be cut again (case b) or c) above), automatically allocating the part to the new theoretical layout advantageously comprises the transformation, in the new theoretical layout, of the relative constraint into an absolute constraint, in order that the position of the reference point of said daughter part with respect to the fabric pattern remains the same as that which it was in the actual layout.

When the defective part is a mother part with which at least one relative constraint or at least one relative symmetry constraint is associated with respect to one or more daughter parts (case b) or c) above), automatically allocating the part to the new theoretical layout also advantageously comprises automatically allocating the one or more daughter parts to the new theoretical layout.

Finally, when the defective part is a part with which a free constraint is associated, automatically allocating the part to a new theoretical layout advantageously comprises the absence in the new theoretical layout of a position constraint of the reference point of the part with respect to the fabric pattern.

The new theoretical layout of the defective parts can be calculated and cut in an area at the end of the actual layout in the direction of advance of the fabric on the cutting table.

Alternatively, the new theoretical layout of the defective parts can be incorporated in a subsequent layout in the direction of advance of the fabric on the cutting table.

The defective part can be:

- a part which, after generating the actual layout, is positioned on a defect of the spread-out fabric; or
- a part which, after generating the actual layout, overlaps another part of the layout; or
- a part which, after generating the actual layout, is positioned on an area of the spread-out fabric which has a large deformation; or
- a part which, after generating the actual layout, cannot be entirely cut in the spread-out fabric; or

- a part which, after generating the actual layout and after cutting, has a cutting defect; or
- a part which, after generating the actual layout, has a geometric defect; or
- a daughter part with which a relative constraint or a relative symmetry constraint with respect to a defective mother part requiring to be cut again is associated.

The defective part cannot be cut in the spread-out fabric.

The invention also relates to a system for automatic cutting of defective parts in a fabric with a pattern repeating at a certain pitch, referred to as the pattern pitch, comprising:

- means for producing a theoretical layout of parts to be cut on a theoretical representation of the fabric, while respecting layout constraints associated with the parts;
- a cutting table on which at least one layer of fabric can be spread out;
- means for ascertaining actual features of at least one portion of the spread-out fabric;
- means for modifying the theoretical layout in order to generate an actual layout of parts on the spread-out fabric, taking into account the actual features of the fabric;
- means for identifying, in the actual layout, defective parts which will contain defects once cut in the fabric and which will need to be cut again; and
- means for automatically allocating each defective part to a new theoretical layout by adjusting the layout constraints associated with the defective parts according to the actual layout.

DESCRIPTION OF THE EMBODIMENTS

The invention relates to the cutting of a layout of a group of parts in a fabric with a repetitive pattern, for example by means of automatic cutting equipment such as that described in the publication EP 0,759,708.

The invention more specifically relates to the automatic cutting of so-called "defective parts" in a fabric with a pattern repeating at a certain pitch.

The preliminary step of such a method consists in characterising the fabric in which the parts will be cut. This step can be carried out by taking manual measurements on the fabric, relying on information supplied by the manufacture or by scanning a strip of material in order to automatically recognise the pattern and characterise it, number of grids, warp pitch, weft pitch, offsets, etc.

Figure 1:
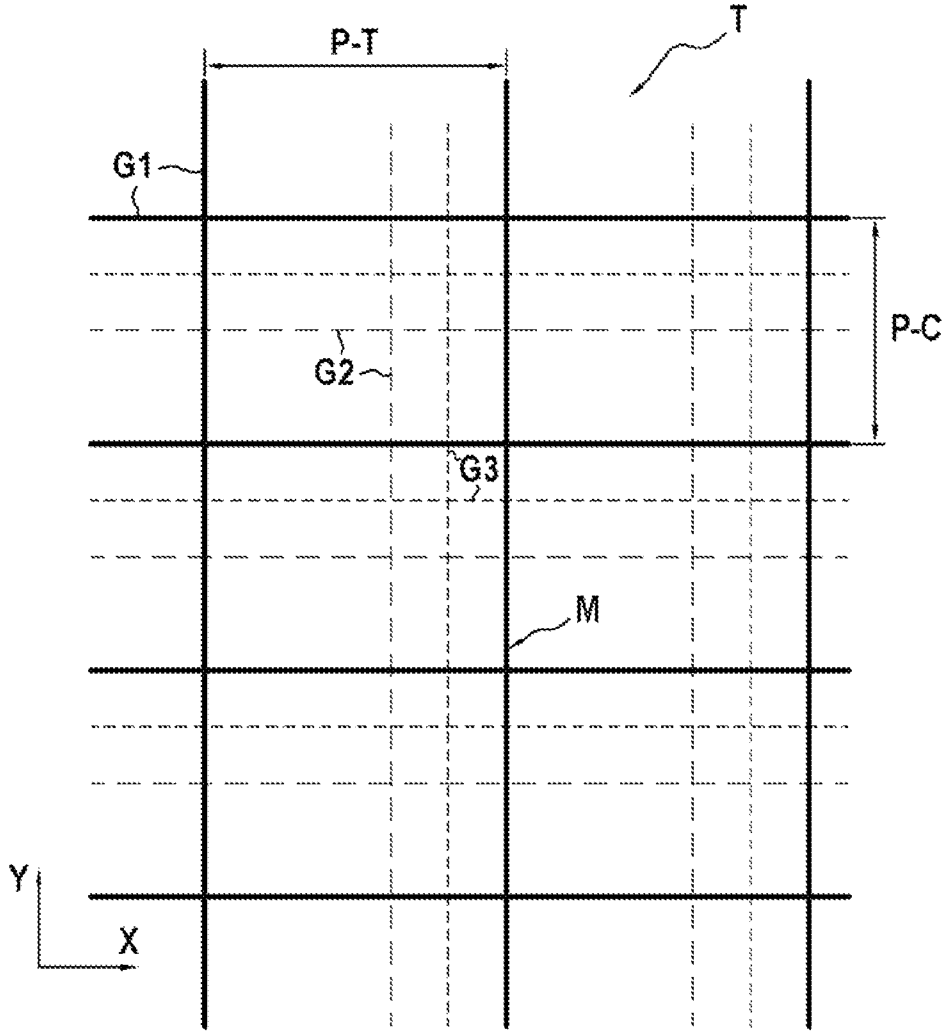
FIG. 1 is a schematic view of an example of repetitively patterned fabric to which the invention applies.

An example of fabric with repeating patterns to which the invention applies is shown in FIG. 1.

In FIG. 1, a fabric T with repeating patterns M is shown, having a main grid G1 and two secondary grids G2, G3, these grids G1 to G3 having offsets in the weft direction and in the warp direction with respect to one another (the warp direction being represented by the X axis and the weft direction by the Y-axis). The patterns M are characterised, in particular, by their warp pitch P-C and their weft pitch P-T.

The information extracted from the characterisation of the fabric T is recorded in order to define a theoretical grid which is used to produce a theoretical layout of the parts.

The producing of a theoretical layout consists in determining, on theoretical grid, the locations of the parts to be cut so as to minimise material losses, while respecting certain constraints (respect of the grain, minimum spacing between the parts to be cut, etc.).

In the case of a fabric with repeating patterns, aesthetic imperatives may impose, on the one hand, for certain parts, the presence of a complete pattern in a particular place on the part, and on the other hand, for two parts intended to be assembled, a cut of these parts ensuring, for example, the continuity of the pattern after assembly.

To this effect, it is known to characterise each part of the layout by assigning it an initial contour, a reference point and at least one layout constraint.

Once the information relating to the theoretical features of the fabric and to the different parts of the layout is determined and recorded, the theoretical layout of the parts is produced respecting the layout constraints associated with the parts.

Figure 2:
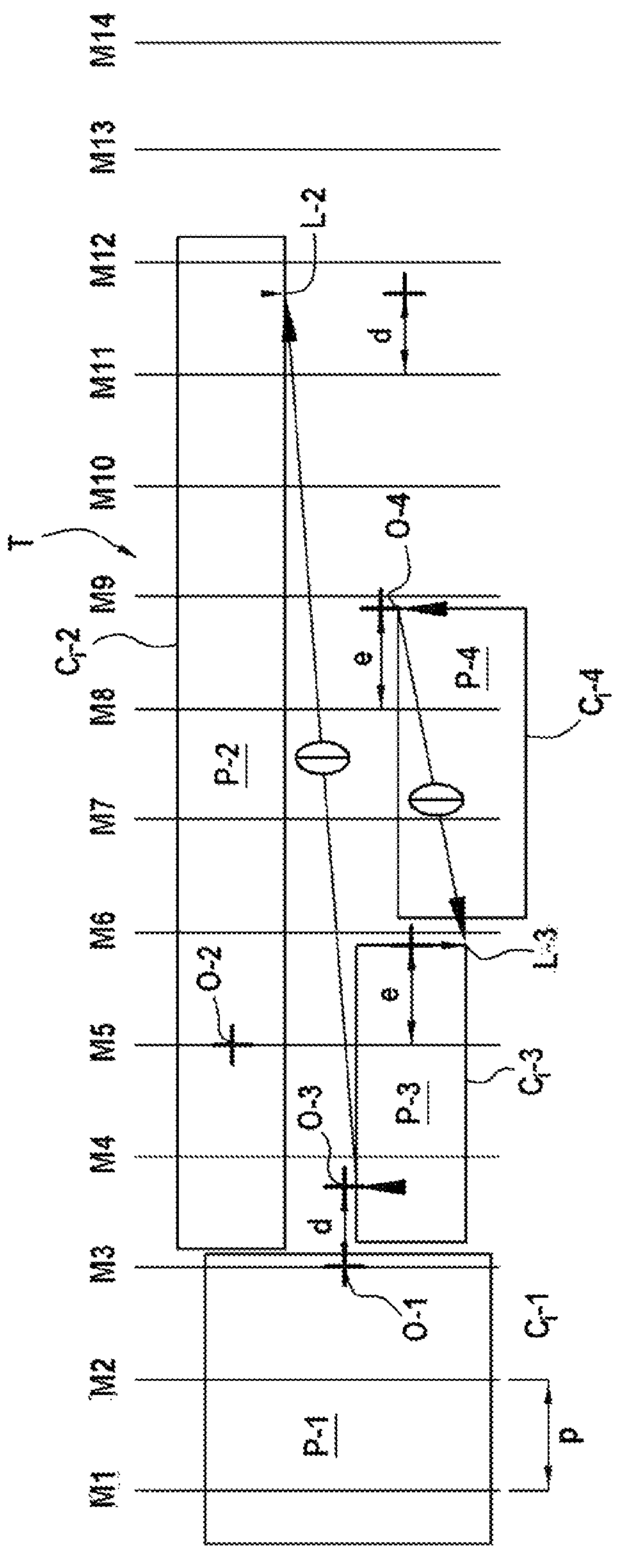
FIG. 2 represents an example of a theoretical layout of parts to be cut.

FIG. 2 shows an example theoretical layout produced for four parts P-1 to P-4 to be cut in a fabric T having, in particular, as pattern, a weft M1, M2, M3, etc. repeating at a predetermined pitch p.

Each of the parts P-1 to P-4 is assigned an initial contour initial, respectively Ci-1, Ci-2, Ci-3 and Ci-4. These initial contours are typically defined by a computer assisted design software (CAD) without any margin. They are represented by a polygon (in this case by rectangles).

A reference point, respectively O-1, O-2, O-3 and O-4, is also associated with each part of the layout P-1 to P-4, and at least one layout constraint of the part on the fabric.

The reference point of each part is defined by the operator whatever the layout constraint used. It involves a point on the part which is important to position.

The layout constraint is chosen by the operator from one of the following layout constraints:

1/ Absolute Constraint:

This constraint is associated with a part which must be positioned on the fabric at a precise place in order that a fabric pattern appears in a desired place on the part.

For this constraint, the position of the reference point of the part with respect to the fabric pattern is predetermined. Hence, in the example of FIG. 2, the parts P-1 and P-2 have an absolute layout constraint: the reference point O-1 of part P-1 is positioned on the weft M3, while reference point O-2 of part P-2 is positioned on weft M5.

2/ Relative Constraint:

This constraint is associated with a first part, referred to as the "daughter part", the position of which on the fabric is determined according to the position of a second part, referred to as the "mother part".

For this constraint, the position of the reference point of the daughter part is determined with respect to a connection point L of the mother part, so that the position of the reference point of the daughter part with respect to the fabric pattern is the same as the position of the connection point of the mother part.

In the example of FIG. 2, part P-3 is a daughter part for part P-2 (mother part). To this effect, the mother part P-2 has a connection point L-2 which enables positioning of the reference point O-3 of the daughter part P-3.

The point L-2 is located at distance d from the weft M11, at 75% of the pitch between M11 and M12. The point O-3 must therefore also be positioned at distance d from a weft. In our example, it is positioned between wefts M3 and M4, at distance d from weft M3.

Similarly, still in the example of FIG. 2, part P-4 is a daughter part for part P-3 (mother part) such that the mother part P-3 has a connection point L-3 which enables positioning of the reference point O-4 of the daughter part P-4.

It should be noted that a same part may contain a plurality of connection points due to the fact that it can be the mother of a plurality of daughter parts.

3/ Relative Symmetry Constraint:

This constraint is also associated with a first part, referred to as the "daughter part", the position of which on the fabric is determined according to the position of a second part, referred to as the "mother part".

With respect to a relative layout constraint, the position of the reference point of the daughter part is determined so as to be symmetric with respect to the pattern of the position of the connection point of the mother part.

4/ Free Constraint:

This constraint is associated with a part, the position of which with respect to the fabric pattern is free (i.e. there is no relative or absolute constraint).

For this constraint, the position of the reference point of the part with respect to the fabric pattern is free.

Once the information relating to the theoretical features of the fabric and to the different parts of the layout is determined and recorded, the theoretical layout of the parts is produced respecting the layout constraints associated with the parts.

The characterisation of each part and the producing of the theoretical layout of the parts are usually carried out by an operator by means of a computer workstation equipped with suitable software. The theoretical layout and the features of the parts are stored.

The following method step consists of spreading out, on the cutting table, at least one layer de fabric T wherein the layout will be cut, then checking at least one portion of the spread-out fabric in order to determine whether the theoretical layout thus produced is correct and, if necessary, correcting it.

The check is typically performed by placing oneself on the spread-out fabric, at the stored coordinates of the characteristic points associated with reference points and connection points, and by checking whether characteristic points of the pattern of the spread-out fabric are indeed found at these locations.

If not, each time the closest characteristic point on the spread-out fabric is searched for and the difference between the stored theoretical position and the closest actual position represents the offset to be corrected for the corresponding part in the layout.

In practice, the check of the spread-out fabric in order to acquire the actual features is performed, for example, by taking and then analysing an image of a portion of the surface of the spread-out fabric around a characteristic point of the pattern. Reference is made to publication EP 0,759,708 which describes an example of checking and correcting the theoretical layout in order to take into account the actual features of the fabric.

At the end of this checking step, the theoretical layout of the parts is modified in order to take into account the actual features of the fabric spread-out on the cutting table. The modification of the theoretical layout thus generates an actual layout of the parts on the spread-out fabric.

Figure 3:
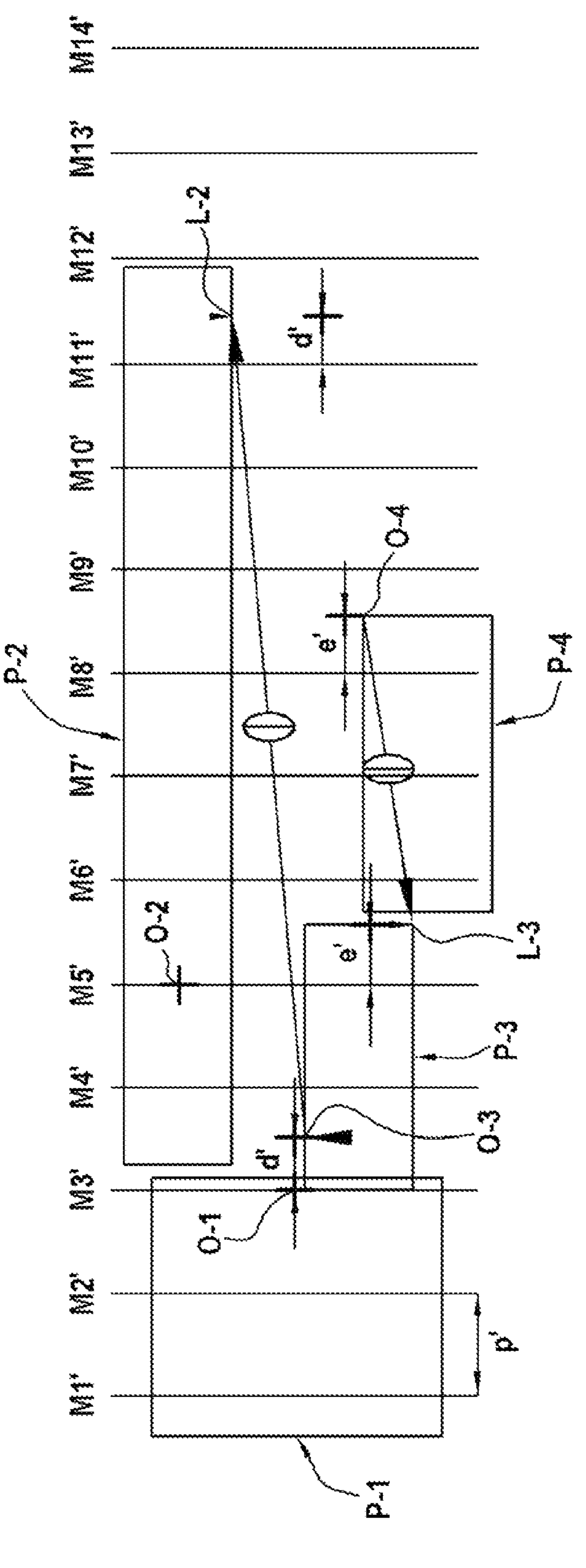
FIG. 3 shows the manner in which the theoretical layout of FIG. 2 can be modified in order to generate an actual layout.

FIG. 3 shows an example actual layout generated on the basis of the theoretical layout of FIG. 2. In this example, the check of the spread-out fabric has made it possible to notice that the pitch <u>p'</u> of the material has increased with respect to the theoretical pitch <u>p</u> (i.e. <u>p'</u> is strictly greater than <u>p</u>).

The position of parts P-1 and P-2, which each have an absolute layout constraint, is modified in order that their respective reference points O-1 and O-2 are positioned on the actual wefts M3' (for part P-1) and M5' (for part P-2) of the spread-out fabric.

The repositioning of the reference point O-2 and the value of the pitch p' cause the connection point L-2 to be located on the actual layout at a distance d' from weft M11', representing 50% of the pitch <u>p'</u> between the actual wefts M11' and M12'.

For part P-3 which is the daughter part of mother part P-2, the actual layout is modified so as to retain the positioning constraint between the points L-2 and O-3. This leads to a positioning of the reference point O-3 of the daughter part P-3 between the actual wefts M3' and M4' with a ratio of 50% of the pitch <u>p'</u> of the spread-out fabric between these actual wefts (instead of 75% of the pitch <u>p</u> on the theoretical grid) corresponding in FIG. 3 to a distance d' from the actual weft M3'.

Similarly, for part P-4 which is the daughter part of mother part P-3, the actual layout is modified to retain the same relative position with respect to the pattern of points L-3 and O-4. This leads to a positioning of the reference point O-4 of the daughter part P-4 between the actual wefts M8' and M9' with a ratio of 50% of the pitch <u>p'</u> of the spread-out fabric between these actual wefts (instead of 90% of the pitch <u>p</u> on the theoretical grid) corresponding in FIG. 3 to a distance e' from the actual weft M8'.

The actual layout which has thus been generated on the basis of the theoretical layout of FIG. 2 has certain problems for the cutting of the parts, and in particular for parts P-1 and P-3 which overlap.

Indeed if, following the step of generating the actual layout, the program for automatically cutting parts of the layout was launched (as is customary in the prior art), the parts P-1 and P-3 would become defective parts which would then need to be cut again.

The method according to the invention aims to provide automatic cutting of these defective parts, whatever the layout constraint associated with these parts.

In general, for this purpose, the method provides for identifying in the actual layout the defective parts which can obtain defects once cut in the fabric and which will need to be cut again (typically parts P-1 and P-3 of the actual layout of FIG. 3), then automatically assigning each defective part to a new theoretical layout by adjusting the layout constraints associated with the defective parts according to the actual layout.

Here, "defective part" shall mean parts of the layout which contain defects once cut in the fabric and which need to be cut again.

In a non-exhaustive manner, the following parts are considered to be defective parts within the meaning of the invention:

- a part which, after generating the actual layout, is positioned on a defect of the spread-out fabric

- a part which, after generating the actual layout, overlaps another part of the layout (the case of parts P-1 and P-3 in FIG. 3)
- a part which, after generating the actual layout, is positioned on an area of the spread-out fabric which has a large deformation
- a part which, after generating the actual layout, cannot be entirely cut in the spread-out fabric
- a part which, after generating the actual layout and after cutting, has a cutting defect
- a part which, after generating the actual layout, has a geometric defect
- a daughter part with which a relative constraint or a relative symmetry constraint with respect to a defective mother part requiring to be cut again is associated.

The identification of defective parts in the actual layout can be carried out automatically before cutting (by analysis of overlapping parts, detection of a defect in the material or a too short material swatch) or manually by an operator at the time of discharging the parts and inspection of the cut parts. In this case, the operator preferably has a graphic interface equipping the cutting machine, allowing him to manually select the defective parts in the layout. More generally, this graphic interface makes it possible to display the layout during cutting and to select the parts to be cut again.

Automatically allocating defective parts in a new theoretical layout is implemented by means of an algorithm for repositioning defective parts, this algorithm being implemented on a computer integrated in the cutting machine or separate therefrom.

The manner in which this repositioning algorithm functions will be described below, taking as examples the defective parts P-1 and P-3 of the actual layout of FIG. 2.

The case of defective part P-1 is relatively simple to treat. This part P-1 has an absolute layout constraint and has no daughter part. In this case, the method according to the invention automatically envisages allocating this part P-1 to the new theoretical layout by retaining, in the new theoretical layout, its absolute constraint with respect to the fabric pattern.

Figure 4:
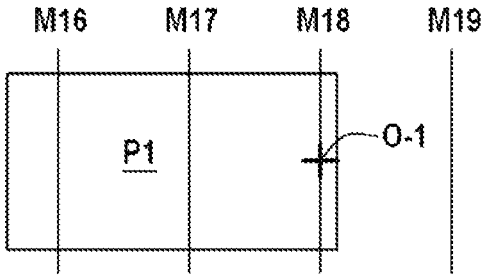
FIG. 4 shows an example of automatically allocating a defective part (having a free constraint) from the actual layout of FIG. 3 to a new theoretical layout.

As shown in the example of FIG. 4, this assignment is manifest by the transfer of the reference point O-1 from part P-1 on to a new weft of the fabric (in this case weft M18) so that the fabric pattern appears at the same place of the part as on the actual layout.

The case of defective part P-3 is, by contrast, more complicated to treat because it involves a part which is the daughter of the mother part P-2.

In order to find the same final position of this part P-3 in the new theoretical layout, the position of its reference point O-3 with respect to the fabric pattern must be the same as the position of the connection point L-2 of the mother part P-2 with respect to the fabric pattern, in other words at distance d' from the actual weft which is equal to 50% of the pitch p' of the spread-out fabric.

Figure 5:
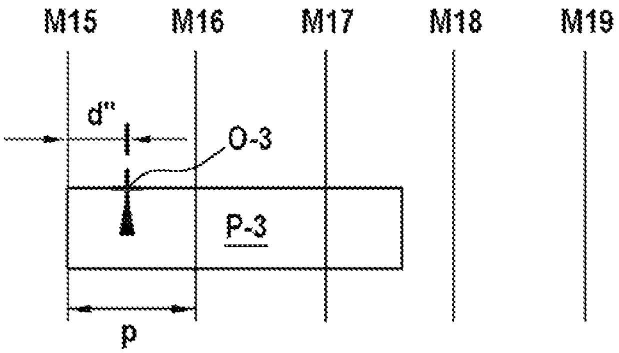
FIG. 5 shows an example of automatically allocating another defective part (having a relative constraint) from the actual layout of FIG. 3 to the new theoretical layout.

As shown in FIG. 5, the assignment of part P-3 to the new theoretical layout thus consists of transferring the reference point O-3 of this part a distance d" from the chosen new weft (here, the weft M15) which corresponds to the same percentage of the pitch of the fabric, in other words to 50% of the pitch p of the fabric.

In certain situations, it may be necessary to have (or choose) to cut again several parts which are linked together by a relative layout constraint.

If the example of parts P-3 and P-4 is taken, which are linked together by a relative layout constraint (the part P-3 is a mother part for the daughter part P-4), automatically allocating these two defective parts to the new theoretical layout is performed in the following manner.

In the actual layout (FIG. 3), part P-3 is placed so that its reference point O-3 is positioned between the actual wefts M3' and M4' at the distance d' from the actual weft M3' equal to 50% of the pitch p' of the spread-out fabric.

As for the part P-4, it is placed in the actual layout (FIG. 3) so that its reference point O-4 is positioned between the actual wefts M8' and M9' at distance e from the actual weft M8' equal to 50% of the pitch p' of the spread-out fabric.

In the new theoretical layout (FIG. 6), the part P-3 is placed so that its relative layout constraint is retained.

Figure 6:
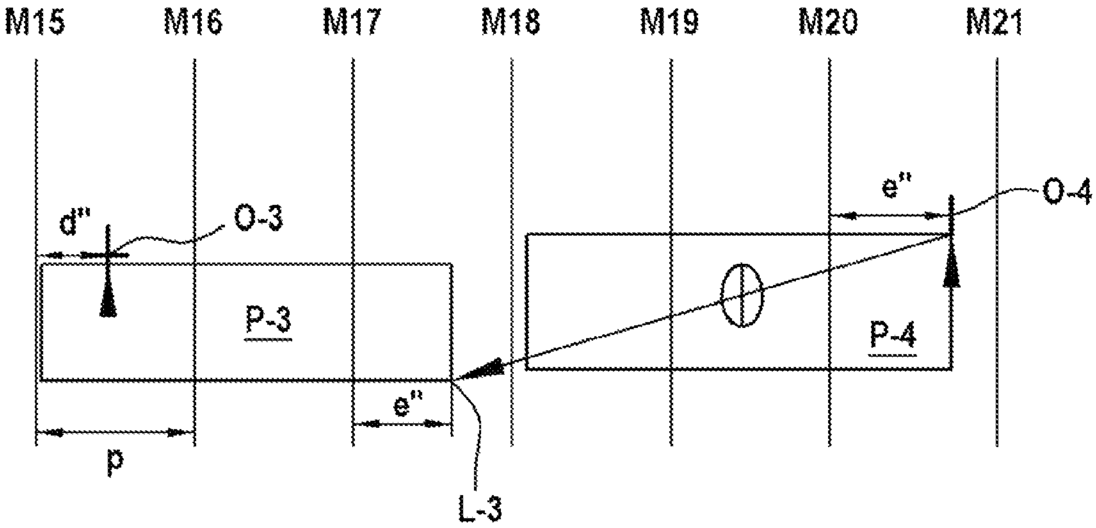
FIG. 6 shows an example of automatically allocating two linked defective parts from the actual layout of FIG. 3 to the new theoretical layout.

To this effect, as shown in FIG. 6, the position of its reference point O-3 with respect to the spread-out fabric pattern must be the same as the position of the connection point of the mother part (part P-2) with respect to the spread-out fabric pattern, namely between the new wefts M15 and M16 at a distance d" from weft M16 which corresponds to the same percentage of the pitch of the fabric, in other words to 50% of the pitch p.

Even if it does not have a defect which would require cutting again, it may be judged necessary by the operator to cut again part P-4 (daughter part of mother part P-3 with defect).

To this effect, as shown in FIG. 6, the repositioning algorithm recalculates the position of the connection point L-3 of the mother part P-3 with respect to the distance e" between the new wefts M17 and M18. This distance e" is then reused in order to calculate the position of the reference point O-4 of the part P-4.

The automatic allocation is thus carried out for each defective part whatever its layout constraint, in order to generate a new theoretical layout comprising all the defective parts.

It should be noted that the repositioning algorithm operates in the same manner for a defective part to which a relative symmetry constraint is associated: in the new theoretical layout, the relative symmetry constraint is transformed into an absolute constraint such that the position of the reference point of the daughter part with respect to the fabric pattern remains the same as it was in the actual layout.

It should also be noted that when the defective part is a mother part with which at least one relative constraint or at least one relative symmetry constraint is associated with respect to one or more daughter parts, the algorithm for repositioning the part on the new theoretical layout can also comprise automatically allocating the one or more daughter parts to the new theoretical layout.

The new theoretical layout of the defective parts can thus then be cut in an area at the end of the actual layout in the direction of advance of the fabric on the cutting table. It can also involve a specific swatch of fabric coming from the same roll as that used for cutting the actual layout and located either following the latter, or further downstream according to the cutting strategy.

Alternatively, the new theoretical layout of the defective parts can be incorporated in a subsequent layout in the direction of advance of the fabric on the cutting table.

Of course, if one or more defective parts are identified during the cutting of the new layout, the operation of automatically allocating these defective parts to a new theoretical layout would be repeated.

The invention claimed is:

1. A method for automatic cutting of defective parts in a fabric with a pattern repeating at a certain pitch, referred to as the pattern pitch, comprising the steps of:

producing a theoretical layout of parts to be cut on a theoretical representation of the fabric whilst respecting layout constraints associated with the parts, in which a reference point and a layout constraint on the fabric are associated with each part to be cut, the layout constraint being chosen from an absolute constraint, a relative constraint, a relative symmetry constraint, and a free constraint;

spreading out at least one layer of fabric on a cutting table;

ascertaining actual features of at least one portion of the spread-out fabric modifying the theoretical layout in order to generate an actual layout of parts on the spread-out fabric, taking into account the actual features of the fabric;

identifying, in the actual layout, defective parts which will contain defects once cut in the fabric and which will need to be cut again; and automatically allocating each defective part to a new theoretical layout by adjusting the layout constraints associated with the defective parts according to the actual layout;

wherein the defective part is:

a part which, after generating the actual layout, is positioned on a defect of the spread-out fabric; or a part which, after generating the actual layout, overlaps another part of the layout; or a part which, after generating the actual layout, is positioned on an area of the spread-out fabric which has a large deformation; or a part which, after generating the actual layout, cannot be entirely cut in the spread-out fabric; or a part which, after generating the actual layout and after cutting, has a cutting defect; or a part which, after generating the actual layout, has a geometric defect; or a daughter part with which a relative constraint or a relative symmetry constraint with respect to a defective mother part requiring to be cut again is associated; and wherein the layout constraint on the fabric associated with each part to be cut is chosen from:

a) the absolute constraint being for which the position of the reference point of the part with respect to the pattern is determined so that the pattern appears in a desired position of the part;

b) the relative constraint being for which the position of the reference point of the part, referred to as the daughter part, is determined with respect to a connection point of another part, referred to as a mother part, so that the position of the reference point of the daughter part with respect to the pattern is the same as the position of the connection point of the mother part;

c) the relative symmetry constraint being for which the position of the reference point of the part, referred to as the daughter part, is determined with respect to a connection point of another part, called the mother part, so that the position of the reference point of the daughter part with respect to the pattern is symmetric with respect to the pattern of the position of the connection point of the mother part; and d) the free constraint being for which the position of the reference point of the part with respect to the pattern is free.

2. The method according to claim 1, wherein, when the defective part is a part with which an absolute constraint is associated, automatically allocating the part to the new theoretical layout comprises retaining this absolute constraint with respect to the pattern in the new theoretical layout.

3. The method according to claim 1, wherein, when the defective part is the daughter part to which a relative constraint or a relative symmetry constraint is assigned with respect to a mother part which does not need to be cut again, automatically allocating the part to the new theoretical layout involves the transformation, in the new theoretical layout, of the relative constraint into an absolute constraint, in order that the position of the reference point of said daughter part with respect to the pattern remains the same as that which it was in the actual layout.

4. The method according to claim 1, wherein, when the defective part is a mother part with which at least one relative constraint or at least one relative symmetry constraint is associated with respect to one or more daughter parts, automatically allocating the part to the new theoretical layout also comprises automatically allocating the one or more daughter parts to the new theoretical layout.

5. The method according to claim 1, wherein, when the defective part is a part with which a free constraint is associated, automatically allocating the part to a new theoretical layout comprises the absence in the new theoretical layout of a position constraint of the reference point of the part with respect to the pattern.

6. The method according to claim 1, wherein the new theoretical layout of the defective parts is calculated and cut in an area at an end of the actual layout in a direction of advance of the fabric on the cutting table.

7. The method according to claim 1, wherein the new theoretical layout of the defective parts is incorporated in a subsequent layout in a direction of advance of the fabric on the cutting table.

8. The method according to claim 1, wherein the defective part is not cut in the spread-out fabric.

9. A system for automatic cutting of defective parts in a fabric with a pattern repeating at a certain pitch, referred to as the pattern pitch, comprising:

means for producing a theoretical layout of parts to be cut on a theoretical representation of the fabric whilst respecting layout constraints associated with the parts, in which a reference point and a layout constraint on the fabric are associated with each part to be cut, the layout constraint being chosen from an absolute constraint, a relative constraint, a relative symmetry constraint, and a free constraint;

a cutting table on which at least one layer of fabric can be spread out;

means for ascertaining actual features of at least one portion of the spread-out fabric;

means for modifying the theoretical layout in order to generate an actual layout of parts on the spread-out fabric, taking into account the actual features of the fabric, means for identifying, in the actual layout, defective parts which will contain defects once cut in the fabric and which will need to be cut again; and means for automatically allocating each defective part to a new theoretical layout by adjusting the layout constraints associated with the defective parts according to the actual layout;

wherein the defective part is:

a part which, after generating the actual layout, is positioned on a defect of the spread-out fabric; or a part which, after generating the actual layout, overlaps another part of the layout; or a part which, after generating the actual layout, is positioned on an area of the spread-out fabric which has a large deformation; or a part which, after generating the actual layout, cannot be entirely cut in the spread-out fabric; or a part which, after generating the actual layout and after cutting, has a cutting defect; or a part which, after generating the actual layout, has a geometric defect; or a daughter part with which a relative constraint or a relative symmetry constraint with respect to a defective mother part requiring to be cut again is associated; and wherein the layout constraint on the fabric associated with each part to be cut is chosen from:

a) the absolute constraint being for which the position of the reference point of the part with respect to the pattern is determined so that the pattern appears in a desired position of the part;

b) the relative constraint being for which the position of the reference point of the part, referred to as the daughter part, is determined with respect to a connection point of another part, referred to as a mother part, so that the position of the reference point of the daughter part with respect to the pattern is the same as the position of the connection point of the mother part;

c) the relative symmetry constraint being for which the position of the reference point of the part, referred to as the daughter part, is determined with respect to a connection point of another part, called the mother part, so that the position of the reference point of the daughter part with respect to the pattern is symmetric with respect to the pattern of the position of the connection point of the mother part; and d) the free constraint being for which the position of the reference point of the part with respect to the pattern is free.

* * * * *